United States Patent Office 3,412,555
Patented Nov. 26, 1968

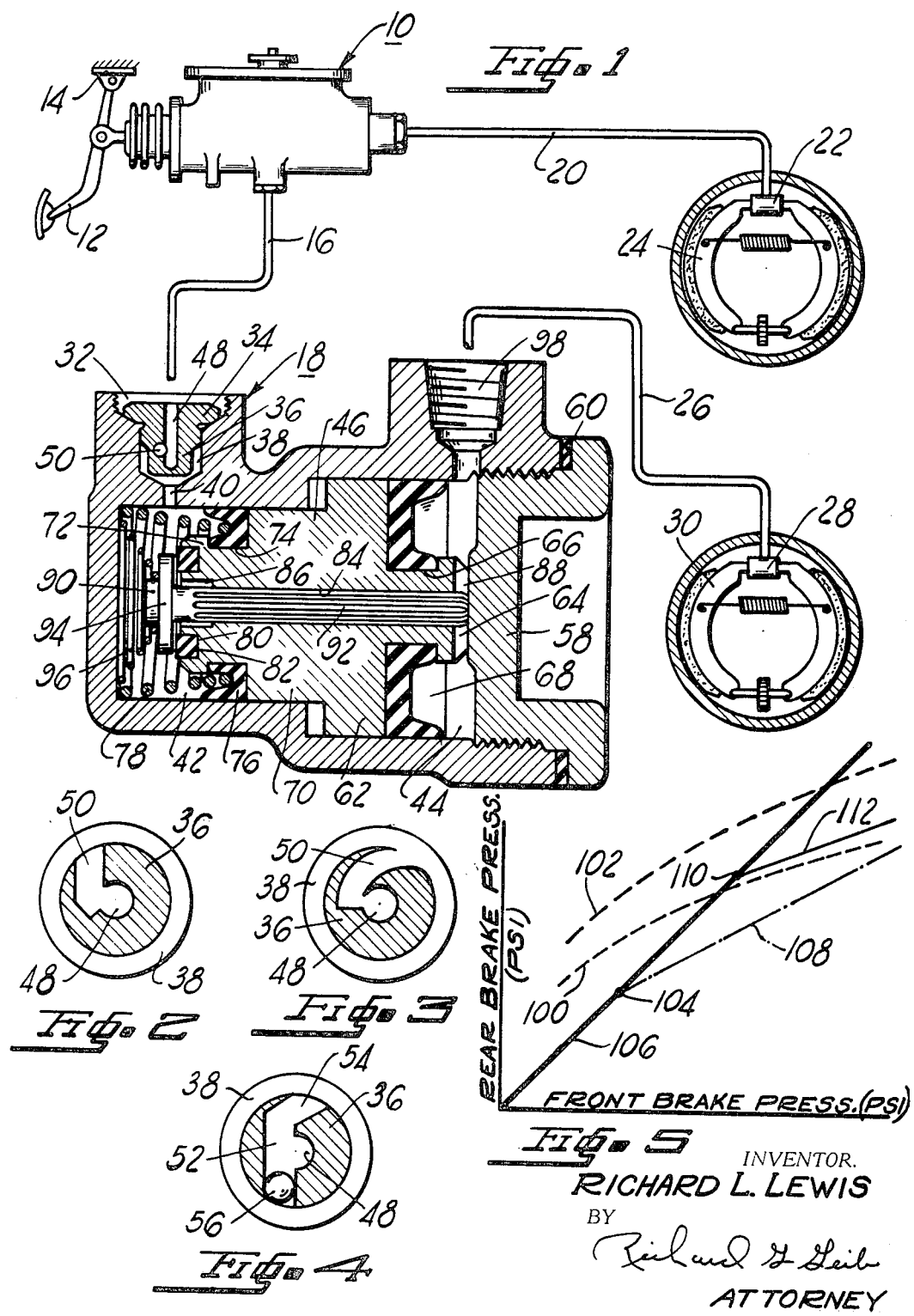

3,412,555
FLUID PRESSURE SURGE DAMPENING MEANS
Richard L. Lewis, St. Joseph, Mich., assignor to The Bendix Corporation, a corporation of Delaware
Filed Sept. 12, 1966, Ser. No. 578,683
6 Claims. (Cl. 60—54.5)

ABSTRACT OF THE DISCLOSURE

A vortex valve within a hydraulic inlet port to a pressure chamber arranged to create a swirling flow in an inlet chamber which is directed to a passage between the pressure chamber and inlet chamber such that pressure pulsations of the hydraulic fluid are removed prior to entering the pressure chamber.

---

This invention relates to fluid pressure dampers for the purpose of dampening out pressure surges in braking systems, particularly braking systems incorporating pressure regulating valves.

In order to equalize braking effectiveness on the wheels of a vehicle, the present trend has been to incorporate brake proportioning and/or anti-skid devices in the fluid pressure braking system. With such control valves the effect of pressure surges from the master cylinder has been taken into consideration in the valve design. As may be readily apparent to those skilled in the art, there is a theoretical ideal relationship for the brake pressure of one set of wheels vs. the brake pressure at another set of wheels. This ideal relationship is more generally plotted as a non-linear curve. Therefore, in order to provide a positive acting valve a compromise linear relationship after valve cut-in is provided in the valve design. However, in reaching the compromise and taking into account the effect of pressure surges, it is quite possible to deviate more than is engineeringly desired from the ideal relationship. Therefore, it is a principal object of this invention to provide a means to dampen pressure surges within a hydraulic braking system so that the design of brake pressure control devices may be simplified.

In this regard, it is another object of this invention to provide a fluid pressure damper which is small, cheap to manufacture and can conveniently be incorporated into any part of a brake system.

It is still another object of this invention to provide a pressure surge dampening means which will be velocity sensitive to restrictively control flow in one direction and permit substantially unrestricted flow in an opposite direction.

A still further, and yet more detailed object of this invention is to provide a tube seat for a fluid pressure inlet that is assembled within the inlet in such a manner as to create an annular chamber therearound and which has fluid passages leading to the annular chamber so as to create a swirling flow in the annular chamber whenever the fluid flow is above a predetermined velocity.

Other objects and advantages of this invention will become apparent from the following description of the drawings in which:

FIGURE 1 is a schematic showing of a braking system having a brake proportioning valve with a fluid pressure dampening means in the inlet thereof in accordance with the principles of my invention;

FIGURE 2 is a cross sectional view of a tube seat within the inlet of the brake proportioning valve of FIGURE 1 taken along the intersection of an axial passage with a radial passage to show the more practical form of manufacturing these tube seats by a simple machining operation;

FIGURE 3 is another cross sectional view of a tube seat with a preferred form of passage leading from the axial passage to the exterior of the tube seat;

FIGURE 4 is another cross sectional view of a tube seat showing a compromise in the manner of providing the radial passage to the exterior of the tube seat; and FIGURE 5 is a graphical illustration comparing the accomplishments of this invention with ideal and prior art pressure proportioning performances.

Referring to the drawings for more specific details of the invention, 10 represents a split master cylinder of conventional type adapted to be actuated by a foot pedal lever 12 pivoted on a suitable support 14.

A fluid pressure delivery pipe or conduit 16 suitably connected to the split system master cylinder 10 supplies pressure from the rear chamber of the master cylinder to a brake proportioning valve 18, and a fluid pressure delivery pump or conduit 20 communicates the forward chamber of the split master cylinder 10 to a wheel cylinder 22 of the front wheel brakes 24 of an associated vehicle. In order to complete the description of the fluid flow in the system, it should be understood that still another delivery pipe or conduit 26 communicates the fluid from the brake proportioning valve 18 to a wheel cylinder 28 for the vehicle's rear wheel brakes 30.

The conduit 16 is connected to an inlet port 32 of the brake proportioning valve 18 by a fitting that mates with a tube seat 34. This tube seat 34 is assembled in the inlet port 32 by press fitting therewithin so that a reduced diameter lower portion 36 is spaced from the lower extremity sidewalls of the inlet 32 to create a chamber 38 around the tube seat 34. An inlet 40 leads from the chamber 38 to a small chamber 42 within a bore in the proportioning valve 18 that is separated from a large chamber 44 by a stepped piston 46. The tube seat 34 is provided with an axial passage 48 that is communicated to a radial passage 50 that opens into the chamber 38 along the peripheral portions of the tube seat 34 (see FIGURE 2). The diameter of the passages 48 and 50 are substantially equal to the diameter of the inlet 40 from the chamber 38 to the chamber 42. The passages 48 and 50 may be more practically formed by drilling axially and radially of the tube seat 34. However, a more preferred form that the radial passage 50 may take is shown in FIGURE 3 wherein the tube seat 34 could be cast to have a generally curving radial passage 50' communicated with the axial passage 48. This is accomplished during the casting of the tube seat 34 by having a removable core insertable through the sidewalls of the mold to mate with an axial core formed in a section of the mold that would be removably attached to yet another section. This part could also be formed by stamping the tube seat to have a passage 50' as in FIGURE 3 and brazing to it a plate at the bottom.

It should also be noted that a compromise between the more practical construction of FIGURE 2 and the ideal construction of FIGURE 3 may be accomplished by a machining operation whereby the radial passage is mated with the axial passage 48 by first drilling normal to the passage 48 a passage 52 and then angularly drilling a passage 54 to open into the normal passage 52 and open out to the chamber 38. After such a machining operation a ball 56 is press fitted to the open end of the normal passage 52 to seal the same.

As for the details of construction of the proportioning valve 18, they may be further described to include a plug 58 sealing the bore in the proportioning valve 18, and more particularly, providing a closure for the large chamber 44. This plug is screw threaded to the housing for the proportioning valve 18 and a seal 60 is compressed between the housing and radial flanges of the plug 58. The piston 46 is mounted to be reciprocable in the bore and is provided with a large face 62 having an extension 64 provided with a circumferential slot 66. A sealing cup 68 is seated on the face 62 and has a lip fitted in the slot 66 so as to retain the cup against displacement. The other end of the piston has a face 70 fitted in the chamber 42. The face 70 has an extension 72 provided with a circumferential slot 74. A sealing cup 76 is seated on the face 70 and has a lip fitted in the slot 74. A spring 78 is installed in a preloaded condition between the end of the bore in the housing for the valve 18 and the cup 76 to normally urge the piston 46 to have its extension 64 abutting the plug 58. The extension 72 is also provided with a groove 80 in its face in which is fitted a valve seat 82.

An axial passage 84 is provided through the piston 46 and communicates with a counterbore 86 in the extension 72 and a radial passage 88 in the extension 64 to communicate chambers 42 and 44. A valve 90 having a slotted stem 92 and a valve head 94 is slidably mounted in the passage 84 to, with the seat 82 control the communication of the chambers 42 and 44. A spring 96 is placed in a preloaded condition between the end of the bore for the valve 18 and the valve head 94 to urge the slotted stem 92 to abut the plug 58, and the length of the projection or extension 72 and the stem 92 are related so that the valve head 94 in the normal released condition is off the seat 82 whereby fluid communication from the inlet 40 will pass through the passage 84 around the slotted stem 92 into the radial passage 88 to the chamber 44. A fluid pressure outlet 98 is in fluid communication with the chamber 44 and the conduit or pipe 26.

In operation, and assuming a normal steady actuation of the brake pedal 12, the master cylinder 10 will develop two separate pressures, one of which is directed through conduit 16 to the valve 18 and the other via the conduit 20 to the wheel cylinder 22. At first the pressure within the valve 18 because of the normal released position of the valve head 94 will flow through the valve 18 to the conduit 26 and thence to the wheel cylinder 28. At this time both of the wheel brakes 24 and 30 are being actuated to engage the associated brake shoes with the associated brake drum. However, as pressure within the large chamber 44 is increased by the steady application of the brake pedal 12 the piston 46 will be translated to the left to close the valve 94 on the seat 82 and terminate the communication from chamber 42 to chamber 44. Thereafter, while simultaneously increasing the braking pressure in the wheel cylinder 22, the small area of the face 70 in conjunction with spring 78 will be opposed by a lower pressure on the larger face 62 to maintain a uniform ratio of pressure between the chambers 42 and 44. This action in maintaining the uniform ratio is either a fluttering of the valve or the restriction of the opening of the passage 84 to maintain differential pressures.

In a rapid application of the brake pedal 12 which would generate a high pressure surge in the conduits 16 and 20, the fluid flowing through the axial passage 48 into the radial passage 50 will be of a high velocity so that upon emerging into the vortex chamber 38, a swirling action will be created to restrict the opening 40 into the chamber 42 so that the pressure surge will not be communicated to the wheel cylinder 28 to cause a premature brake lock and/or to the chamber 44 to cause premature shut off of the valve 94 on the seat 82.

It should thus be realized that, as seen in FIGURE 5, the proportioning valve will be designed to cut in at a higher pressure than is permissible with prior art devices. In reference to this figure, lines 100 and 102 respectively reflect the unloaded and loaded ideal relationship of front to rear brake pressures. Prior art proportioning valves, in order to prevent pressure surges from creating premature rear brake locking, have been designed to cut in at point 104 on the linear curve 106 representing the pressure developed by a master cylinder. In these devices the rear pressure then develops at a rate substantially less than the front pressure, as shown by line 108, which rate is chosen to cross the ideal curves 100 and 102 at some point beyond the normal maximum pressure. However, in order to compromise between a loaded and unloaded vehicle, the slope of line 108 is such that it does not even remotely parallel the ideal curves 100 nor 102. This means that the compromise is far from ideal. However, with the device of this invention the cut in of the proportioning valve is delayed until point 110 on the line 106; and, as this pressure is at or about the point on line 106 which crosses the ideal curve 100 for an unloaded vehicle, the proportioning valve thereafter will develop a more gradual increase of rear brake pressure as related to front brake pressure, as shown by line 112. This line 112 will be more consistent with the trailing slopes for curves 100 and 102, so that the proportioning of brake pressures between front and rear can be more of an engineering compromise than heretofore possible.

Having thus described the various features of the invention, what I claim as new and desire to secure by Letters Patent is:

1. For use in a brake system having a master cylinder and an actuator means operably connected thereto, a means to prevent too rapid a pressurization of the actuator means by said master cylinder, said means comprising a valve means including: an axial passage in fluid communication with the master cylinder;
   a radial passage normal to said axial passage and communicated to said axial passage;
   an annular vortex chamber about said valve means, said chamber having an axial outlet in fluid communication with the actuator means and downstream of said radial passage.

2. A means to restrict the inlet flow and permit unrestricted return flow in a hydraulic brake system, said means comprising:
   a housing having an inlet port and an outlet port with a chamber therebetween; and
   a tube seat in said chamber including a stepped body creating an annular chamber about said body in said housing adjacent said outlet port, an axial bore in said body and a single passage normal to said bore communicated with said bore and open to said annular chamber to direct fluid from said bore onto a curving wall of said chamber upstream of said outlet port whereby fluid swirls towards said outlet port and freely flows about said tube seat from said outlet port to said single passage.

3. A means according to claim 2 wherein an axis of said passage is offset with respect to the axis of the annular chamber so that fluid entry to said annular chamber is substantially tangential to the wall of said chamber.

4. A means according to claim 3 wherein said outlet port in said bore is of a substantially small diameter than the annular chamber.

5. A means according to claim 4 wherein said bore is in communication with a hydraulic pump and said annular chamber is connected to an actuator.

6. A means according to claim 1 wherein said radial passage opens into said vortex chamber on a plane substantially tangential with the surface of said body.

References Cited

UNITED STATES PATENTS 2,205,806   6/1940   Bělenkij _____ 60—54.6
3,122,162   2/1964   Sands _____ 137—498

MARTIN P. SCHWADRON, *Primary Examiner.*

ROBERT R. BUNEVICH, *Assistant Examiner.*